Jan. 1, 1974 W. TIETZE 3,783,030

GALVANIC ELEMENT

Filed March 13, 1972

United States Patent Office 3,783,030
Patented Jan. 1, 1974

3,783,030
GALVANIC ELEMENT
Werner Tietze, Hagen, Germany, assignor to Varta AG, Frankfurt am Main, Germany
Filed Mar. 13, 1972, Ser. No. 234,019
Claims priority, application Germany, Mar. 16, 1971, G 71 09 863.0
Int. Cl. H01m 5/00
U.S. Cl. 136—134 P 3 Claims

ABSTRACT OF THE DISCLOSURE

Galvanic element includes an electrical conductor formed of an electrically conductive base material having an incision therein defining a tongue-shaped member bendable out of the incision.

The invention relates to a galvanic element and more particularly to a gas-tight storage cell having an electrically conductive housing.

Storage cells having no specifically constructed poles but possessing an electrically conductive housing are connected into multicell batteries by means of additional spot-welded conductors. In gas-tight button cells, for example, circuit elements, such as contact cups, annular soldering lugs and strip conductors in various forms and lengths have been known heretofore.

Such heretofore known circuit elements have the disadvantage that they are contemplated only for specific functions, thus, for example, the contact cups for joining button cells.

Button cell batteries are furnished with strip conductors or the like at the end poles thereof.

It is an object of the invention to provide a conductor which is applicable for virtually all possible connections of cell to cell and which can thereby replace the various different circuits used heretofore.

With the foregoing and other objects in view, there is provided, in accordance with the invention, in a galvanic element, an electrical conductor formed of an electrically conductive base material having an incision therein defining a tongue-shaped member bendable out of the incision.

Other features which are considered as characteristic for the invention are set forth in the appended claims.

Although the invention is illustrated and described herein as galvanic element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
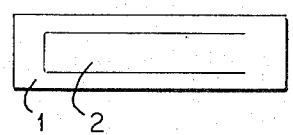
FIG. 1 is a plan view of the electrical conductor of the invention.
Figure 2:
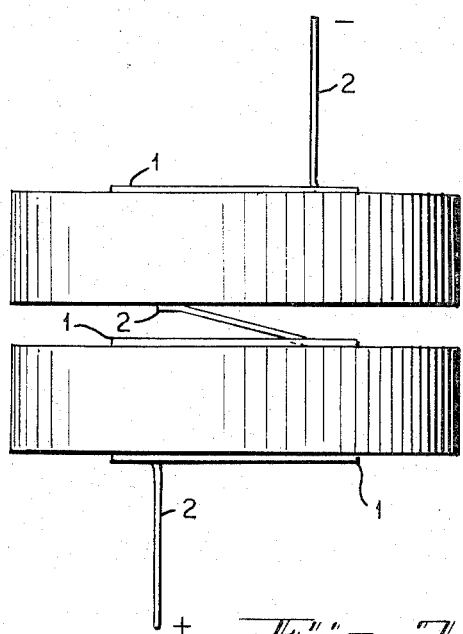
FIGS. 2 and 3 are two different embodiments of storage batteries wherein the cells are connected to one another in different ways by electrical conductors according to the invention.
Figure 3:
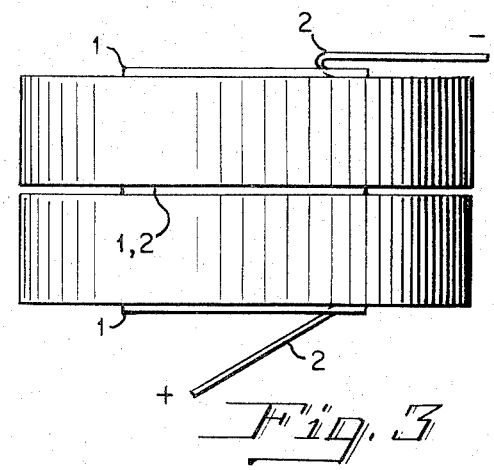

Referring now to the drawing and first, particularly to FIG. 1 thereof, there is shown therein an electrical conductor formed of electrically conductive material constructed in accordance with the invention. The particular form of the conductor shown in FIG. 1 may be modified to suit the particular demands as long as the principal structural features thereof are maintained. As is apparent in FIG. 1, the electrical conductor of the invention is formed of an electrically conductive base material 1 and a tongue-like member 2 bendable out of a U-shaped incision formed in the base material 1. The base material 1, which is of rectangular shape in the illustrated embodiment but which can have any other suitable shape within the scope of the invention, serves as a connection or terminal for an upper cell housing, if the conductor is chosen for contacting individual elements. In FIGS. 2 and 3, the conductor 1, 2 of the invention is shown as a connecting element between the cells of a storage battery.

Figure 1A:
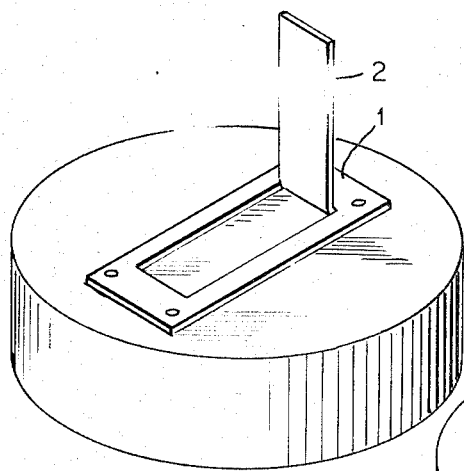
FIGS. 1a and 1b are perspective views of the electrical conductor spot-weld in two different ways to a cell housing.
Figure 1B:
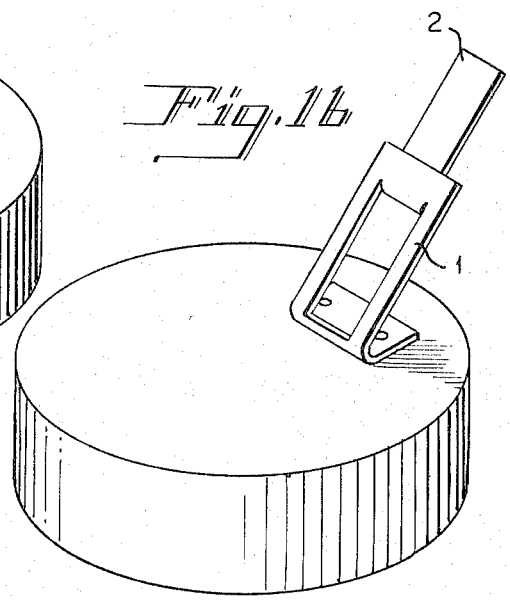

If the conductor 1, 2 is to be used for current terminals at the end cells of a battery, it can be spot-welded to the end cell housing as shown either in FIG. 1a or FIG. 1b. As employed in FIG. 1a, the conductor 1, 2 is electrically spot-welded at both ends thereof to the cell housing. The tongue-like member 2 is bent at a right angle out of the incision formed in the base material 1 of the conductor and can be then further connected to flexible cables or the like. In FIG. 2, the conductor 1, 2 is spot-welded only at one end thereof, the base material 1 being bendable in the same manner as the tongue 2 through an angle up to 180° about the spot-welded end thereof. The length of the conductor 1, 2 is thereby increased, a feature which is very desirable in various instances of use.

The inventive conductor 1, 2 of the instant application is obviously also applicable to other storage batteries or elements such as, for example, cylindrical or prismatic storage batteries. Furthermore, with this invention, a manufacturing program can be considerably simplified, because cell diameters of varying size are able to be accommodated with one specific conductor length of the base material by employing the double bend of the conductor according to FIG. 1b.

I claim:

1. A galvanic conductor element in combination with an electrically conductive battery cell housing, including: an electrical conductor provided with a rectangularly shaped electrically conductive base portion and a tongue integrally formed with said base by a U-shaped incision on said base portion, said tongue portion being bendable out of said incision to extend the length of said conductor element; said conductive base portion being joined to said battery cell housing at one end to thereby enable movement of such base portion and extendable tongue portion for up to 180° with respect to said housing.

2. Galvanic element according to claim 1 including an electrically conductive storage battery cell housing, said base portion of said electrical conductor being connected by spot-welding to said housing.

3. Galvanic element according to claim 1 wherein: said base portion is connected by spot-welding to said housing at one end thereof and said tongue portion being bendable out of said base portion along a line at the opposite end of said one end; said base and extendable tongue portions being bendable up to an angle of 180° with respect to said housing.

References Cited

UNITED STATES PATENTS

| | | | |
|---|---|---|---|
| 2,216,666 | 10/1940 | Hempel | 136—173 |
| 3,615,867 | 10/1971 | Cich | 136—111 |
| 2,495,247 | 1/1950 | Friedman | 136—135 R |
| 2,847,495 | 8/1958 | Nagorski | 136—111 |
| 2,611,794 | 9/1952 | Peterson | 136—135 R |
| 1,377,126 | 5/1921 | Haefele | 136—135 R |

DONALD L. WALTON, Primary Examiner

U.S. Cl. X.R.
136—135 R; 339—252 R